US012263682B2

(12) United States Patent
Tamaru et al.

(10) Patent No.: US 12,263,682 B2
(45) **Date of Patent: *Apr. 1, 2025**

(54) LIQUID EJECTION APPARATUS

(71) Applicant: CANON KABUSHIKI KAISHA, Tokyo (JP)

(72) Inventors: Yuji Tamaru, Tokyo (JP); Kazumasa Matsushita, Kawasaki (JP); Chiaki Muraoka, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

This patent is subject to a terminal disclaimer.

(21) Appl. No.: 17/746,766

(22) Filed: May 17, 2022

(65) Prior Publication Data

US 2022/0274412 A1 Sep. 1, 2022

Related U.S. Application Data

(62) Division of application No. 16/988,517, filed on Aug. 7, 2020, now Pat. No. 11,358,393.

(30) Foreign Application Priority Data

Aug. 14, 2019 (JP) ................................ 2019-148861

(51) Int. Cl.
*B41J 2/175* (2006.01)

(52) U.S. Cl.
CPC ................................ *B41J 2/17509* (2013.01)

(58) Field of Classification Search
None
See application file for complete search history.

(56) References Cited

U.S. PATENT DOCUMENTS

2012/0044285 A1* 2/2012 Ogasawara .......... B41J 2/17546 347/6
2021/0129551 A1* 5/2021 Mizutani ................ B41L 45/06

FOREIGN PATENT DOCUMENTS

JP 2008-296535 A 12/2008
JP 2015163483 A 9/2015
JP 2018-008513 A 1/2018
JP 2018-140570 A 9/2018

* cited by examiner

*Primary Examiner* — Justin Seo
(74) *Attorney, Agent, or Firm* — Canon U.S.A., Inc. I.P. Division

(57) ABSTRACT

A liquid ejection apparatus includes a liquid container for containing liquid which has a refilling port for refilling the liquid container with liquid, a contained liquid information memory unit for storing information on the liquid contained in the liquid container, a refilling liquid information memory unit for storing information on the liquid to be supplied for refilling the liquid container, a liquid ejection head for ejecting the liquid supplied from the liquid container and a control unit for controlling operation of the liquid ejection apparatus according to the information stored in the contained liquid information memory unit and the information stored in the refilling liquid information memory unit.

3 Claims, 10 Drawing Sheets

LIQUID EJECTION APPARATUS

CROSS-REFERENCE TO RELATED APPLICATIONS

The present application is a divisional of U.S. patent application Ser. No. 16/988,517, filed on Aug. 7, 2020, which claims priority from Japanese Patent Application No. 2019-148861 filed Aug. 14, 2019, which are hereby incorporated by reference herein in their entireties.

BACKGROUND

Field

The present disclosure relates to a liquid ejection apparatus.

Description of the Related Art

Liquid ejection apparatus, which typically include inkjet recording apparatus, basically comprise a liquid ejection head and a liquid container containing liquid to be fed to the liquid ejection head. An image is recorded by the liquid ejection head as liquid is ejected from the liquid ejection head to the outside. The liquid containers of liquid ejection apparatus include removable cartridge type containers that can be replaced when the liquid in the container is almost gone and stationary type containers that can be refilled with liquid from the outside when only an insufficient amount of liquid is left in the container. Stationary type liquid containers have a refilling port by way of which the liquid is refilled. The refilling port is normally closed with a cap or the like. When the liquid is to be refilled, the cap is removed to expose the refilling port and a part of an external liquid container (e.g., bottle) is put into the refilling port to transfer the liquid in the external liquid container into the stationary liquid container.

There are liquid ejection apparatus having two or more stationary type liquid containers. Such liquid ejection apparatus are accompanied by a risk that some of the containers can unexpectedly and mistakenly be refilled with wrong liquid. For instance, one of the containers that is a container for containing cyan ink can be refilled with yellow ink. When one of the containers of such a liquid ejection apparatus is unexpectedly and mistakenly refilled with wrong liquid, the recording operation of the liquid ejection apparatus can adversely be affected and/or the liquid ejection apparatus can be damaged. In view of this sort of problems, Japanese Patent Application Laid-Open No. 2018-39225 discloses an arrangement with which a portable information terminal reads out the two-dimensional code attached to a bottle and transmits it to its management server and the management server verifies the received information on the liquid contained in the bottle. If the management server finds that the content of the bottle is not a right one, it displays an error message on the portable information terminal to tell that the content of the bottle is not a right one. Meanwhile, Japanese Patent Application Laid-Open No. 2016-30386 discloses an arrangement for communications between the RF tag applied to an ink pack and the communication unit of a printing apparatus (liquid ejection apparatus) for the purpose of referring by the control unit of the printing apparatus to the information on the ink color and the instruction for the use of the ink contained in the ink pack. If the ink pack is found to be a wrong one as a result of the reference, a warning message is displayed and/or a voice warning is issued by the control unit of the printing apparatus.

With either of the arrangement described in Japanese Patent Application Laid-Open No. 2018-39225 and the arrangement described in Japanese Patent Application Laid-Open No. 2016-30386, when the liquid in the bottle is found to be incorrect liquid, the portable information terminal of the printing apparatus of the former patent literature or the control unit of the printing apparatus of the latter patent literature, displays a warning message and/or a voice warning is issued from it. However, there still remains a risk that the user of the liquid ejection apparatus may not be attentive enough and may fail to recognize the warning and mistakenly refill the liquid container with the incorrect liquid to seriously damage the recording operation. Additionally, with either of the arrangement described in Japanese Patent Application Laid-Open No. 2018-39225 and the arrangement described in Japanese Patent Application Laid-Open No. 2016-30386, the user cannot recognize a situation where the assumed liquid is contained in the external container, which may be a bottle or an ink pack, in inappropriate conditions because, for example, the liquid has evaporated to a considerable extent. In other words, if the liquid is an appropriate one in terms of type and/or color but held in the external container in inappropriate conditions and hence the liquid container of the liquid ejection apparatus is refilled inappropriately, the recording operation can also adversely be affected. In short, the effect of preventing the above that are attributable to refilling operation from taking place of the arrangement described in Japanese Patent Application Laid-Open No. 2018-39225 and the arrangement described in Japanese Patent Application Laid-Open No. 2016-30386 has limitations.

SUMMARY

A liquid ejection apparatus according to the present disclosure includes a liquid container configured to contain liquid and has a refilling port for refilling the liquid container with liquid, a contained liquid information memory unit configured to store information on the liquid contained in the liquid container, a refilling liquid information memory unit configured to store information on the liquid to be supplied for refilling the liquid container, a liquid ejection head configured to eject the liquid supplied from the liquid container, and a control unit configured to control an operation of the liquid ejection apparatus according to the information stored in the contained liquid information memory unit and the information stored in the refilling liquid information memory unit.

Further features of the present disclosure will become apparent from the following description of exemplary embodiments with reference to the attached drawings.

DESCRIPTION OF THE EMBODIMENTS

The present disclosure provides a liquid ejection apparatus that can minimize occurrences of problems attributable to a liquid refilling operation such as an operation of refilling a liquid container with incorrect liquid or liquid held in inappropriate conditions into a liquid container.

Now, embodiments of the present disclosure will be described below by referring to the accompanying drawings.

Figure 1:
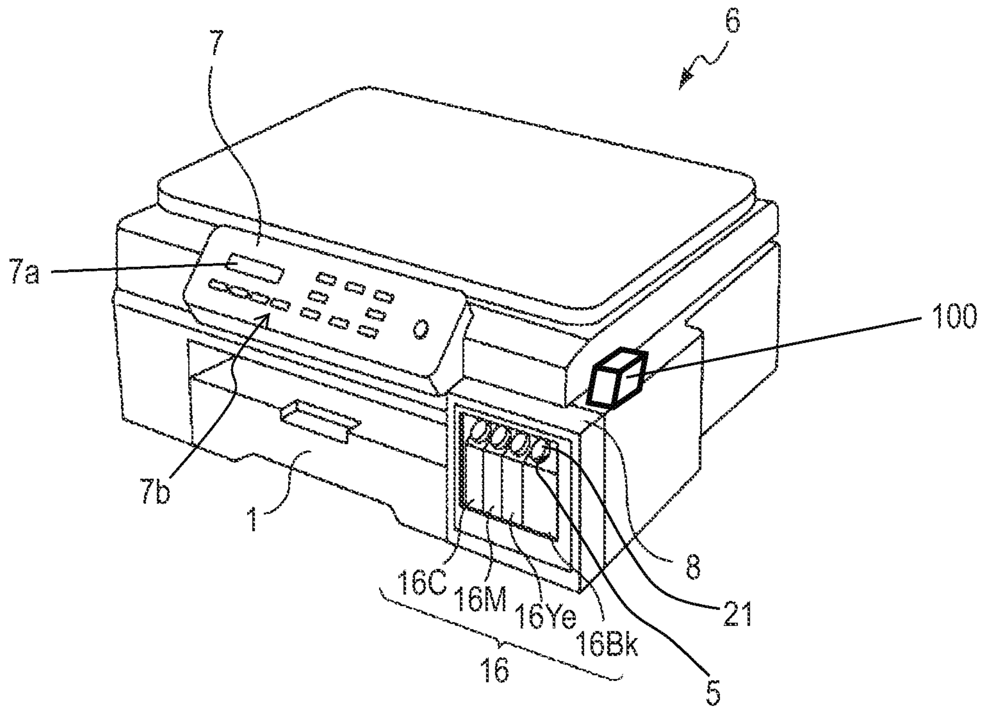
FIG. 1 is a schematic perspective view of an embodiment of liquid ejection apparatus according to the present disclosure.
Figure 2:
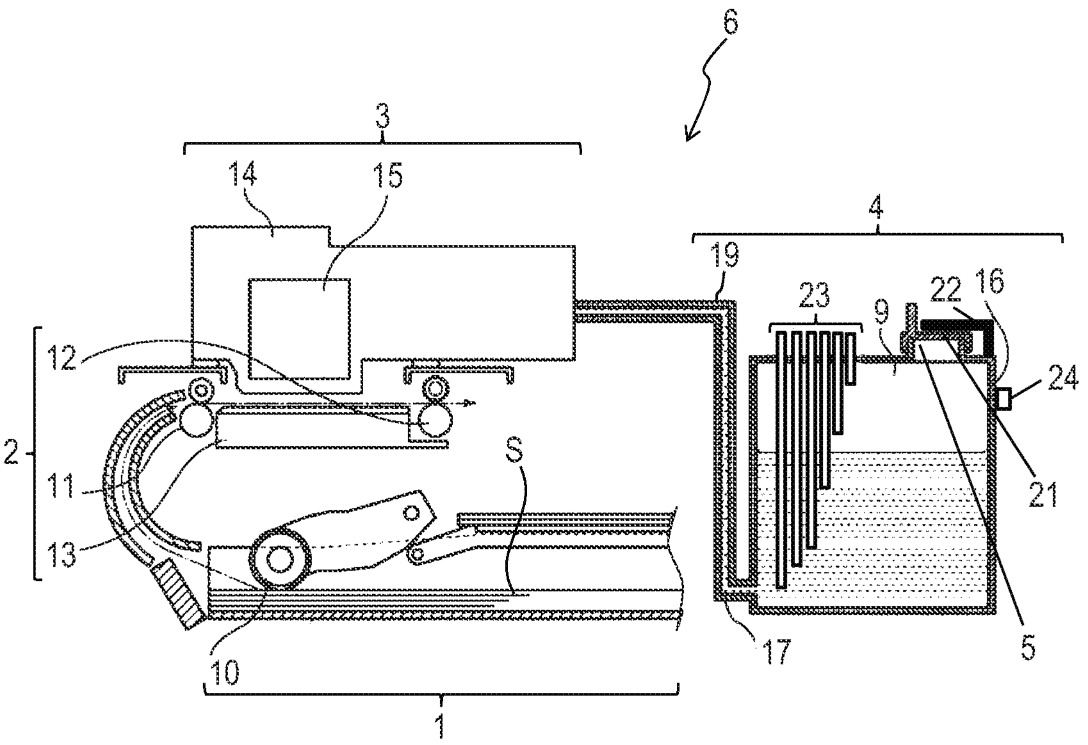
FIG. 2 is a schematic cross-sectional view of the liquid ejection apparatus shown in FIG. 1.

FIG. 1 and FIG. 2 show an embodiment of liquid ejection apparatus according to the present disclosure, which is an inkjet recording apparatus. FIG. 1 is a schematic perspective view of the inkjet recording apparatus 6 (to be also referred to simply as "recording apparatus" hereinafter). FIG. 2 is a schematic longitudinal cross-sectional view of the recording apparatus 6, showing the internal configuration thereof. The recording apparatus 6 comprises a first feeder section 1, a second feeder section 2, a recording unit 3 and a liquid supply unit 4. The first feeder section 1 picks up a recording medium S at a time from a bundle of recording mediums S by means of a feeder roller 10 and supplies it to the second feeder section 2. The second feeder section 2 is arranged on the downstream side relative to the first feeder section 1 as viewed in the recording medium conveyance direction and conveys further the recording medium S fed from the feeder roller 10 by means of a conveyance roller 11, a paper delivery roller 12 and so on. A platen 13 for supporting the recording medium S that is being conveyed from downward in a vertical direction is arranged between the conveyance roller 11 and the paper delivery roller 12.

As shown in FIG. 2, the recording unit 3 includes a carriage 14 that reciprocates in directions orthogonal relative to the conveyance direction of the recording medium S and a liquid ejection head 15 mounted on the carriage 14. Although not shown, the liquid ejection head 15 has an ejection section where a plurality of ejection orifices for ejecting liquid (ink) are arranged. The plurality of ejection orifices of the ejection section are respectively held in communication with pressure chambers that contain respective energy generating elements therein and open to the outside. As each of the energy generating elements is fed with electric power and driven to operate, it generates ejection energy, which typically is heat, and applies the ejection energy to the liquid contained in the pressure chamber. The liquid to which the energy is applied is then ejected from the ejection orifice toward the recording medium. The energy generating elements may typically be heat-generating resister elements or piezoelectric elements. A desired image is, one or more desired characters are or a desired pattern is recorded on the recording medium S as the recording medium S is conveyed to the recording position and electric power is applied to the energy generating elements according to the recording data given to the liquid ejection head 15.

The liquid supply unit 4 includes a stationary type liquid container 16, a liquid path 17 that is held in communication with the liquid container 16 and a flexible liquid supply tube 19 that connects the liquid path 17 to the liquid ejection head 15. The liquid container 16 is provided with a residual liquid quantity detection mechanism 23 and a thermistor 24. The residual liquid quantity detection mechanism 23 may typically be formed by using six stainless steel rods. When liquid exists between two adjacently located stainless steel rods, electricity is conducted through the two stainless steel rods. When, on the other hand, no liquid exists between two adjacently located stainless steel rods, no electricity is conducted through the two stainless steel rods. The surface level of the liquid contained in the liquid container 16 can be estimated by arranging a plurality of stainless steel rods having different lengths preferably in the ascending or descending order of their lengths and seeing up to which stainless steel rod electricity is conducted and from which stainless steel rod electricity is not conducted. Then, as a result, the quantity of the liquid contained in the liquid container 16 can be determined. The thermistor 24 is employed to measure the temperature of the inside of the liquid container 16.

The liquid container 16 contains the liquid to be ejected from the ejection orifices of the liquid ejection head 15. After ejecting the liquid from the liquid ejection head 15 and when negative pressure prevails in the liquid ejection head 15, the liquid contained in the liquid container 16 is fed to the liquid ejection head 15 by way of the liquid path 17 and the liquid supply tube 19. At this time, air is allowed to flow into the liquid container 16 through the atmosphere communication port (not shown) arranged vertically right above the liquid container 16 by an amount substantially equal to the amount of liquid fed to the liquid ejection head 15. As far as this specification is concerned, the expression of "vertically" refers to the vertical direction when the recording apparatus 6 is in operation. For instance, referring to FIG. 2, the feeder roller 10 is located vertically right below the liquid ejection head 15.

The recording apparatus 6 of this embodiment is a color printer designed to eject liquids (inks) of a plurality of different colors in order to record a color image on a recording medium S. Therefore, the liquid ejection head 15 is provided with a plurality of ejection sections for respective different types of liquids. More specifically, this embodiment is provided with four ejection sections for ejecting inks of four different colors of yellow, cyan, magenta and black. Likewise, the recording apparatus 6 of this embodiment is provided with four liquid containers 16 for respectively storing four different types of liquid. FIG. 1 shows the liquid container 16C for storing cyan liquid, the liquid container 16M for storing magenta liquid, the liquid container 16Ye for storing yellow liquid and the liquid container 16Bk for storing black liquid.

Figure 3:
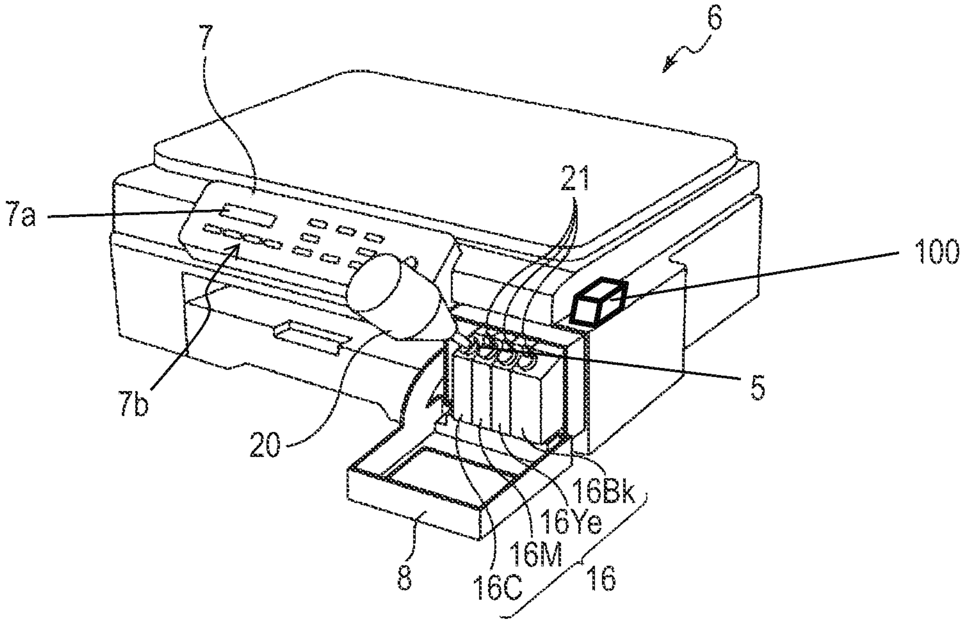
FIG. 3 is a schematic perspective view of the embodiment of liquid ejection apparatus shown in FIG. 1 in an operation of refilling one of the liquid containers with liquid.

Each of the liquid containers 16 is provided with a refilling port 5 for supplying liquid for refilling the inside (liquid containing chamber 9) of the liquid container 16. Normally, the refilling port 5 is closed by means of a cap 21. For refilling the liquid container 16 with liquid, firstly the cover 8 arranged on the front surface of the recording apparatus 6 is turned forward to open it and the cap 21 fitted to the refilling port 5 is removed as shown in FIG. 3. Then, the refilling port 5 is exposed and the spout of the bottle 20, which is an external container, is put into the exposed refilling port 5. Subsequently, when the bottle 20 is a flexible bottle, the liquid in the bottle 20 is poured into the liquid container 16 by way of the refilling port 5 typically by depressing the bottle 20 with hand. In this way, the liquid container 16 is refilled with liquid. With the arrangement illustrated in FIG. 3, the cap 21 is provided with a knob, although the design of the cap does not matter so long as the cap 21 can be fitted to the refilling port 5 to close the refilling port 5 and removed from the refilling port 5 to expose the refilling port 5. The cap 21 may be such a one that it can be moved away from the liquid container 16 and isolated once it is removed from the refilling port 5 or, alternatively, it may be tied to a part of the liquid container 16 even when it is removed from the refilling port 5. Additionally, the bottle 20 may not necessarily be depressed (e.g., held) with hand to pour the refilling liquid. In other words, the bottle 20 may be so designed that when the bottle 20 is fitted to the refilling port 5, two flow paths, one for liquid and another for gas, are established between the bottle 20 and the liquid container 16 and the gas in the container 16 is smoothly replaced with liquid. Then, the liquid container 16 can be refilled with liquid without depressing the bottle with hand.

The recording apparatus 6 has a display unit 7 that includes a panel 7*a* for displaying signs and characters and operation keys 7*b*. The user of the recording apparatus 6 can verify, for instance, the amount of liquid remaining in the liquid container 16 by visually recognizing the message being displayed on the panel 7*a*. For example, when the amount of liquid contained in the liquid container 16 falls below a predetermined level, the panel 7*a* of the display unit 7 displays that the liquid in the liquid container 16 has fallen below the predetermined level and hence the user needs to replenish the liquid. Note, however, the design of the display unit 7 is not limited to the illustrated one and the display unit 7 may only have a panel 7*a*.

Figure 4:
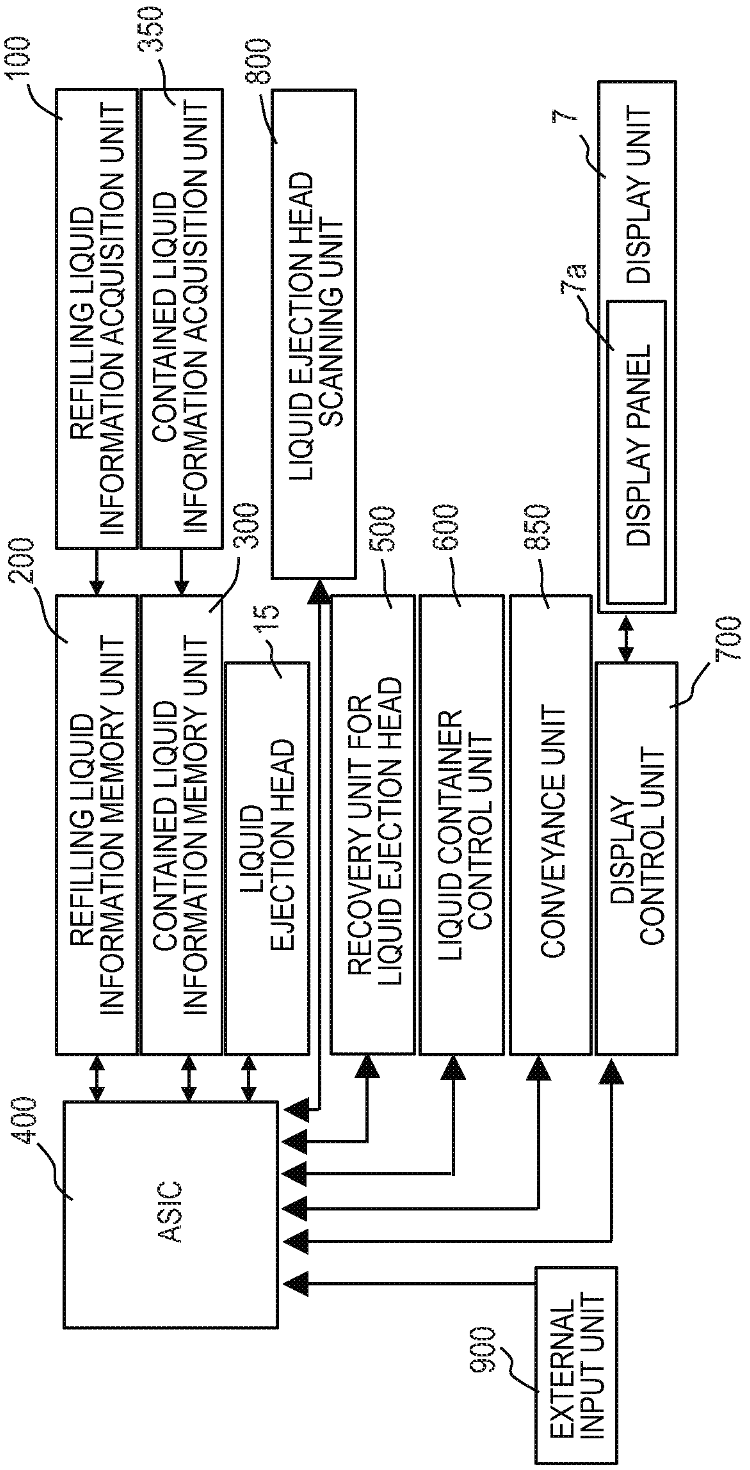
FIG. 4 is a block diagram of the control system of the liquid ejection apparatus shown in FIG. 1.

FIG. 4 is a block diagram of the control system of the recording apparatus 6. The core of the control system of the recording apparatus 6 is an application specific integrated circuit (ASIC) 400. The ASIC 400 includes a plurality of input/output ports, an arithmetic/logic unit and a control unit. It is a principal unit that communicates with the component units of the recording apparatus 6 and controls the overall operation of the recording apparatus 6.

The recording apparatus 6 comprises a liquid ejection head 15, a recovery unit 500 for the liquid ejection head 15, a liquid container control unit 600, a scanning unit 800 of the liquid ejection head 15 and a conveyance unit 850 for recording mediums, all of which are connected to the ASIC 400. The scanning unit 800 includes the carriage 14, which is described earlier, and can reciprocate in directions that are orthogonal relative to the recording medium conveyance direction of the carriage 14 on which the liquid ejection head 15 is mounted. The conveyance unit 850 includes in its turn the first feeder section 1 having the above-described feeder roller 10, the conveyance roller 11, the paper delivery roller 12 and the second feeder section 2, which has the platen 13 and so on.

The recording apparatus 6 also comprises a display control unit 700 and an external input unit 900, both of which are also connected to the ASIC 400. The display control unit 700 has the panel 7*a* of the display unit 7 display the amount of the liquid remaining in the liquid container 16 as described above. The user of the recording apparatus 6 typically uses the external input unit 900 to specify the type of liquid to be ejected and the type of liquid that needs to be replenished.

The recording apparatus 6 further comprises a memory unit 200 for storing refilling liquid information and a memory unit 300 for storing contained liquid information, both of which are connected to the ASIC 400. A refilling liquid information acquisition unit 100 is connected to the refilling liquid information memory unit 200. The refilling liquid information acquisition unit 100 acquires information relating to the refilling liquid and the refilling liquid information memory unit 200 stores the information acquired by the acquisition unit 100. A contained liquid information acquisition unit 350 is connected to the contained liquid information memory unit 300. The contained liquid information acquisition unit 350 acquires information relating to the liquid contained in the liquid container 16 and the contained liquid information memory unit 300 stores the information acquired by the contained liquid information acquisition unit 350. Both the refilling liquid information memory unit 200 and the contained liquid information memory unit 300 of this embodiment are formed by using an EEPROM (electrically erasable programmable read-only memory), although either one or both of the refilling liquid information memory unit 200 and the contained liquid information memory unit 300 can alternatively be formed by using some other information storage means such as the register in the ASIC 400 or a SROM (static random access memory).

The refilling liquid information acquisition unit 100 of this embodiment has a reader/writer for radio frequency identification (RFID) (not shown). The reader/writer acquires the information stored in the RFID tag (not shown) arranged on an external container (e.g. the bottle 20) by scanning the RFID tag. Note, however, that the information on the liquid with which the liquid container 16 is to be refilled may alternatively be acquired by some other means. For instance, the refilling liquid information acquisition unit 100 may alternatively comprise an optical code reader (not shown). Such an optical code reader scans the QR code (trade name, not shown) or a bar code (not shown), which is a two-dimensional code displayed on the bottle 20 or on a medium (not shown) packed together with the bottle 20, to acquire information on the refilling liquid.

Still alternatively, the refilling liquid information acquisition unit 100 may have an infrared data communication module (not shown). Then, the user of the recording apparatus 6 scans the QR code or the bar code shown on the bottle 20 or on the medium packed together with the bottle 20 by means of a smartphone (not shown) or the like to acquire information on the refilling liquid. Subsequently, the infrared data communication module acquires information on the refilling liquid from the smartphone by means of infrared data communication.

Still alternatively, the refilling liquid information acquisition unit 100 may have a BLE (Bluetooth (trade name) Low Energy) module (not shown). Then, the user of the recording apparatus 6 scans the QR code or the bar code shown on the bottle 20 or on the medium packed together with the bottle 20 by means of the smartphone or the like to acquire information on the refilling liquid. Subsequently, the BLE module acquires information on the refilling liquid from the smartphone by means of BLE data communication.

Still alternatively, the refilling liquid information acquisition unit 100 may have an optical code reader and a LAN (local area network) module (not shown). Then, the user of the recording apparatus 6 scans the QR code or the bar code shown on the bottle 20 or on the medium packed together with the bottle 20 by means of the smartphone or the like to acquire information on the refilling liquid. Subsequently, the smartphone transmits the acquired information on the bottle 20 to a separately provided communication server (not shown) by way of a network. The communication server stores information linked to the bottle 20. Then, the optical code reader scans the QR code or the bar code shown on the bottle 20 or on the medium packed together with the bottle 20 and the LAN module acquires information on the refilling liquid by way of the network.

Still alternatively, the external input unit 900, which may be an information input means designed to acquire information by way of wireless communications or wired communications or the input means of an external device, may be made to also operate as the refilling liquid information acquisition unit 100. Then, the refilling liquid information acquisition unit acquires refilling liquid information at least through the information input means using wireless communications, the information input means using wired communications or the input means of the external device. For instance, the recording apparatus 6 can acquire information relating to the refilling liquid as the user of the recording apparatus 6 inputs the information on the refilling liquid shown on the bottle 20 or on the medium packed together with the bottle 20 from the external input unit 900.

As described above, the RFID tag, the QR code, the bar code or the like that is to be read out by the refilling liquid information acquisition unit 100 is arranged on the bottle 20 or on the medium packed together with the bottle 20. Then, the RFID tag, the QR code, the bar code or the like displays or stores pieces of information on the refilling liquid in the bottle 20 and such pieces of information typically include Manufacturer Part Number (MPN), Color (CL), Lot Number (LN), Net Quantity (NET), Time and Date of Injection ID, Standard Expiration Date (Standard ED), Time and Date of 1st Opening (OD1), 1st Time Supply Quantity (S1), Time and Date of 2nd Opening (OD2), 2nd Time Supply Quantity (S2) and Assumed Evaporation Rate (AE). It is also possible to determine and store the elapsed time (elapsed days) to date from 1st Time Supply on the basis of Time and Date of 1st Opening OD1. It is also possible to determine and store the elapsed time (elapsed days) to date from Last Time Supply (2nd Time Supply) on the basis of Time and Date of 2nd Opening OD2. Additionally, the RFID tag, the QR code, the bar code or the like is also provided with unused flag F1, in-use flag F2 and used up flag F3. In other words, this embodiment stores not only the type and color of filling liquid but also Net Quantity (NET), Time and Date of Injection ID, Standard Expiration Date (ED), Time and Date of 1st Opening (OD1), 1st Time Supply Quantity (S1), Time and Date of 2nd Opening (OD2), 2nd Time Supply Quantity (S2) and Assumed Evaporation Rate (AE). As will be described hereinafter, it is possible to know the state of the refilling liquid on the basis of the above-listed pieces of information. More specifically, it is possible to estimate the change in the state of the liquid that gives rise to a change in the viscosity of the liquid that affects the liquid ejection performance of the recording apparatus 6 on the basis of the above-listed pieces of information. Then, it is possible to maintain a good liquid ejection performance of the recording apparatus 6 by regulating the ejection conditions on the basis of the estimated change in the state of the liquid. The structure of the refilling liquid information acquisition unit 100 is not limited to the above-described one and a refilling liquid information acquisition means selected from an optical means, an electromagnetic means, a mechanical means and so on can be employed to acquire refilling liquid information depending on the type of the information medium that is fitted to the bottle 20.

Furthermore, this embodiment stores not only pieces of information relating to the refilling liquid but also pieces of information relating to the liquid contained in the liquid container 16. More specifically, the contained liquid information memory unit 300 stores pieces of information relating to the liquid contained in the liquid container 16 such as those listed below. Namely, the contained liquid information memory unit 300 stores such pieces of information as Manufacturer Part Number MPN, Color CL, Lot Number LN, Amount of Residual Liquid RA, Assumed Evaporation Rate AE and so on of the contained liquid. Additionally, the contained liquid information memory unit 300 also stores Temperature History of Liquid Container TH, Used Quantity History of Contained Liquid UH, Liquid Supply History SH, Time and Date of Last Supply LSD, Time and Date of Latest Move LMD, Cap Open Time COT, Approved Period of Liquid Retention AP and so on. Normally usable flag F4, use with caution flag F5, usage warning flag F6, do not use flag F7 and protect the recording apparatus flag F8 are set in the contained liquid information memory unit 300. Since the pieces of information relating to the liquid contained in the liquid container 16 are stored in this embodiment as described above, the user of the recording apparatus 6 can compare these pieces of information with the corresponding pieces of information that relate to the refilling liquid. As a result of this comparison, the user can estimate the change in the state of the liquid in the liquid container 16 that will take place as a result the scheduled liquid refilling operation and adjust the conditions of liquid ejection after the liquid refilling operation so as to make the liquid ejection performance of the recording apparatus 6 after the liquid refilling operation substantially same as the liquid ejection performance of the recording apparatus 6 before the liquid refilling operation. After the liquid refilling operation, the user of the recording apparatus 6 of this embodiment can make the recording apparatus 6 ready for the next refilling operation by overwriting (updating) the pieces of information on the liquid contained in the liquid container 16. Thus, as described above, since this embodiment stores not only the pieces of information on the liquid with which the liquid container 16 is to be refilled but also the pieces of information on the liquid contained in the liquid container 16 prior to the liquid refilling operation, the user of this embodiment can adjust the conditions of the liquid container 16 so as not to make the liquid ejection performance of the embodiment change after the liquid refilling operation. Furthermore, the user of the embodiment can control the embodiment so as to make it possible for the embodiment to substantially constantly maintain a good performance level by checking the conditions under which the embodiment ejects liquid after each of a number of times of liquid refilling operations.

More specifically, when the liquid container 16 is refilled with liquid, the ASIC 400 operates the refilling liquid information acquisition unit 100 so as to acquire the information on the refilling liquid that is stored in the information medium attached to the bottle 20. In this embodiment, the liquid container 16 has a cap retainer 22, which cap retainer 22 retains the cap so as not to allow the cap 21 to be removed unless refill liquid flag F9 is turned on by the ASIC 400. The refill liquid flag F9 turns on as the refilling liquid information acquisition unit 100 (e.g., reader/writer) reads out the information stored on the information medium (e.g. RFID tag). The refill liquid flag F9 turns off when the cap 21 is removed and put back again. Any of various known mechanisms can selectively be adopted to make the cap 21 to be interlocked with the refill liquid flag F9 and allow the cap 21 to be able to selectively take an openable state and an unopenable state.

Note, however, it may be so arranged that information on the liquid to be refilled in the liquid container 16 can be acquired by some other means. For example, the cover 8 may be provided with a cover retainer (not shown) and it may be so arranged that the cover 8 cannot be taken away unless the refill liquid flag F9 turns on as in the instance of the cap retainer 22. With either of the above-described arrangements, the member (cap 21 or cover 8) that covers the refilling port 5 of this embodiment can be opened to expose the refilling port 5 of the liquid container 16 only when the refill liquid flag F9 is on. So long as the refill liquid flag F9 is off, the member that covers the refilling port 5 of the embodiment cannot be opened and hence the refilling port 5 cannot be exposed either.

Alternatively, it may be so arranged that, when the refill liquid flag F9 is on and hence the cap 21 or the cover 8 can be opened, the display unit 7 displays a message that prompts the user of the recording apparatus 6 to provide information on the refilling liquid to the refilling liquid information acquisition unit 100.

Still alternatively, it may be so arranged that, when a new bottle 20 containing refilling liquid is supplied for the first time, any recording operation is prohibited until information on the refilling liquid is provided. It is also possible to arrange such that, when the refill liquid flag F9 is off, the liquid ejection head is disabled to eject liquid.

Now, an exemplar control arrangement for making it possible for the recording apparatus 6 to maintain a good and generally constant liquid ejection performance level during a period extending over before and after a liquid refilling operation on the basis of available various pieces of information relating to the refilling liquid will be described below.

Figure 5:
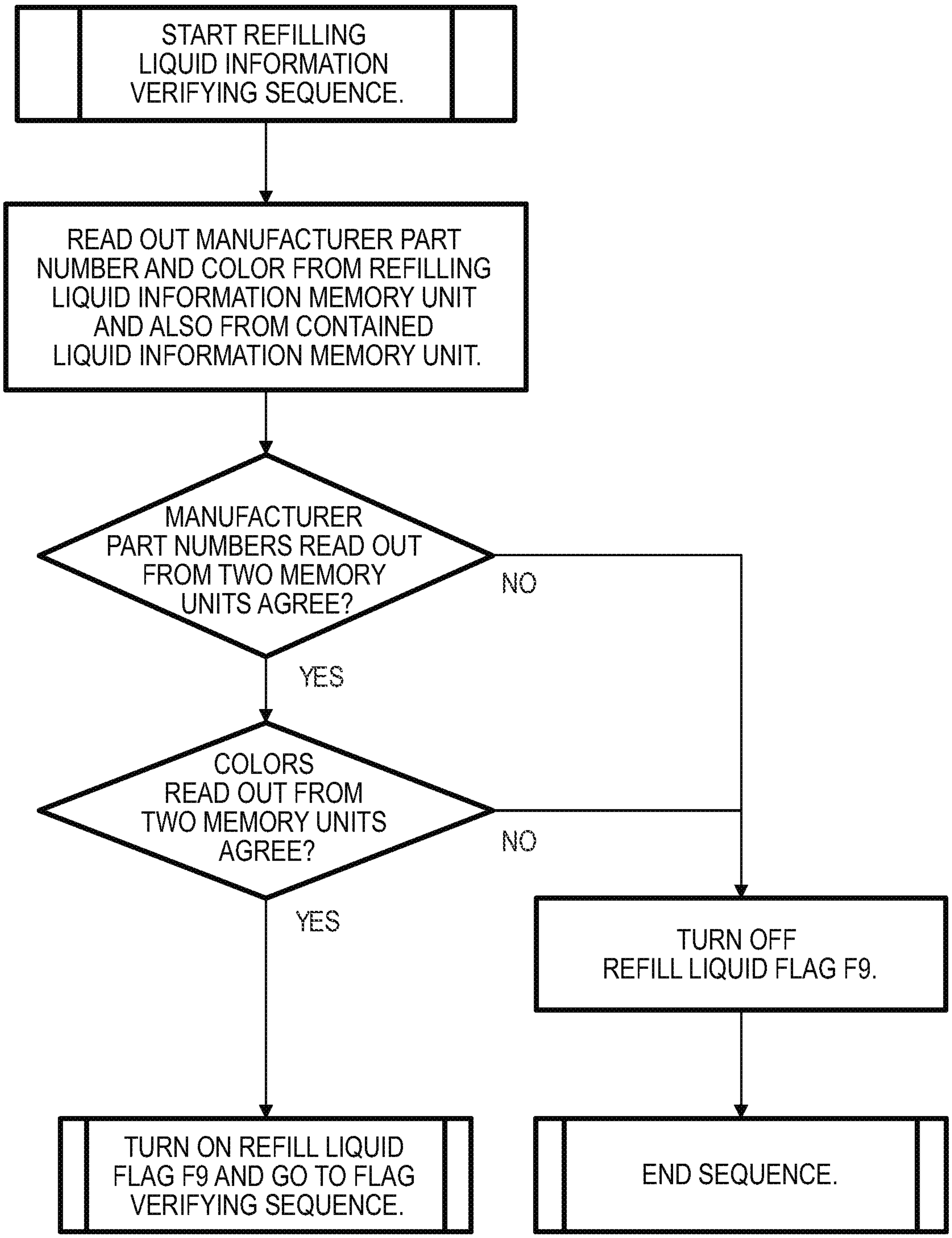
FIG. 5 is a flowchart of the refilling liquid information verifying sequence of the liquid ejection apparatus shown in FIG. 1.

FIG. 5 shows a flowchart of the refilling liquid information verifying sequence of the liquid ejection apparatus. The ASIC 400 reads out Manufacturer Part Number MPN and Color CL of the refilling liquid contained in the bottle 20 from the refilling liquid information memory unit 200. Then, the ASIC 400 reads out Manufacturer Part Number MPN and Color CL of the liquid contained in the liquid container 16 from the contained liquid information memory unit 300. Thereafter, the ASIC 400 compares Manufacturer Part Number MPN and Color CL of the refilling liquid it has read out from the refilling liquid information memory unit 200 and Manufacturer Part Number MPN and Color CL of the liquid contained in the liquid container 16 it has read out from the contained liquid information memory unit 300. When either Manufacturer Part Number MPN of the refilling liquid and Manufacturer Part Number MPN of the contained liquid disagree (not compatible) with each other or Color CL of the refilling liquid and Color CL of the contained liquid disagree with each other, the ASIC 400 terminates the sequence, keeping the refill liquid flag F9 off. Since the refill liquid flag F9 remains off, the cap 21 or the cover 8 cannot be removed and the intended liquid refilling operation is physically prevented from taking place.

Figure 6:
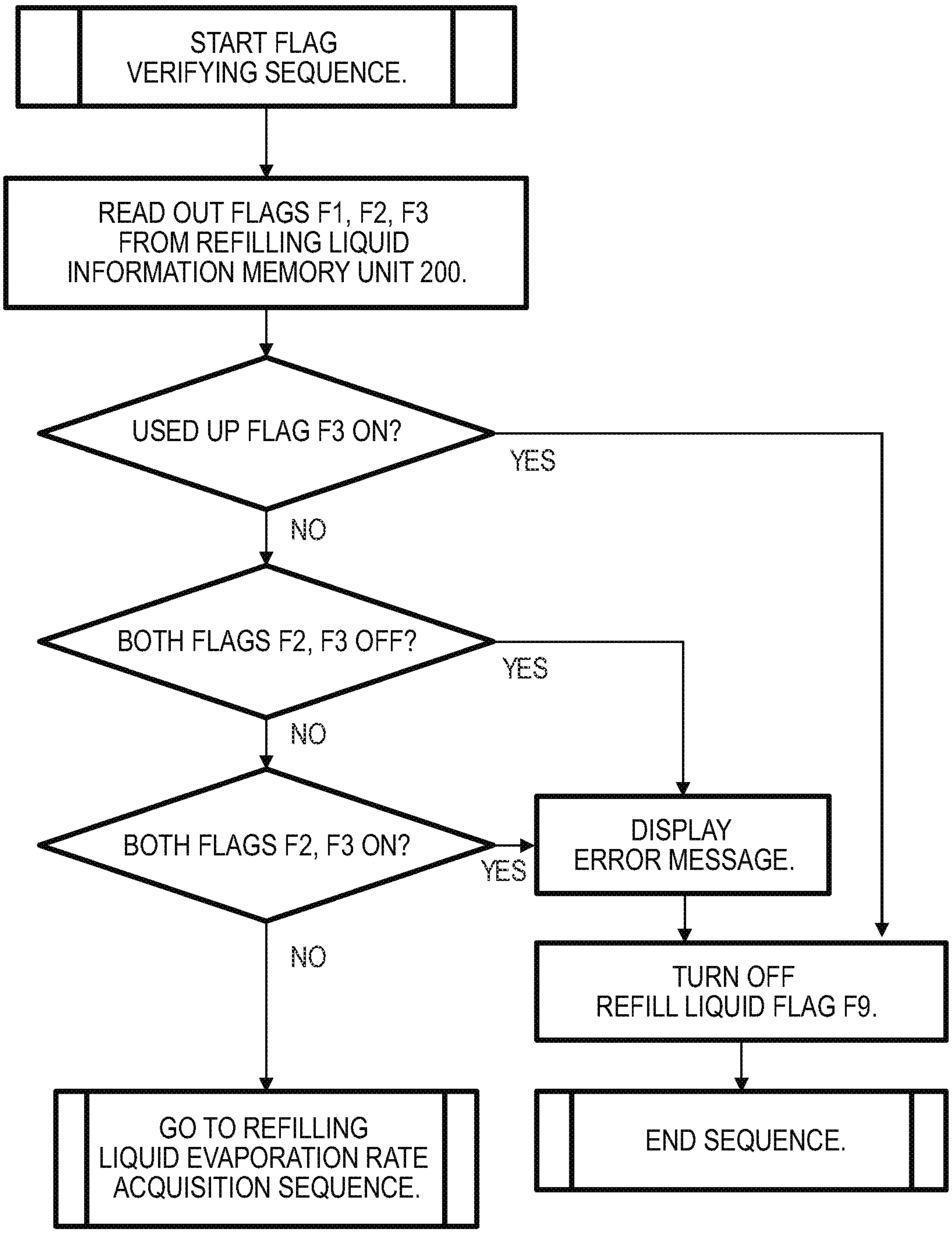
FIG. 6 is a flowchart of the flag verifying sequence that follows the sequence of FIG. 5.

When, on the other hand, both Manufacturer Part Number MPN of the refilling liquid and Manufacturer Part Number MPN of the contained liquid agree (are compatible) with each other and both Color CL of the refilling liquid and Color CL of the contained liquid agree with each other, the refill liquid flag F9 is turned on and the ASIC 400 moves to the flag verifying sequence shown in FIG. 6. Because the refill liquid flag F9 is turned on and hence either the cap 21 or the cover 8 can now be removed, the refilling port 5 can be opened and the embodiment is brought into a state of being ready for a liquid refilling operation. Note here that, with this embodiment, the correct value of Manufacturer Part Number MPN and the correct value of Color CL are written and stored in the contained liquid information memory unit 300 in the manufacturing process of the recording apparatus 6 according to the specifications of the recording apparatus 6.

Figure 7:
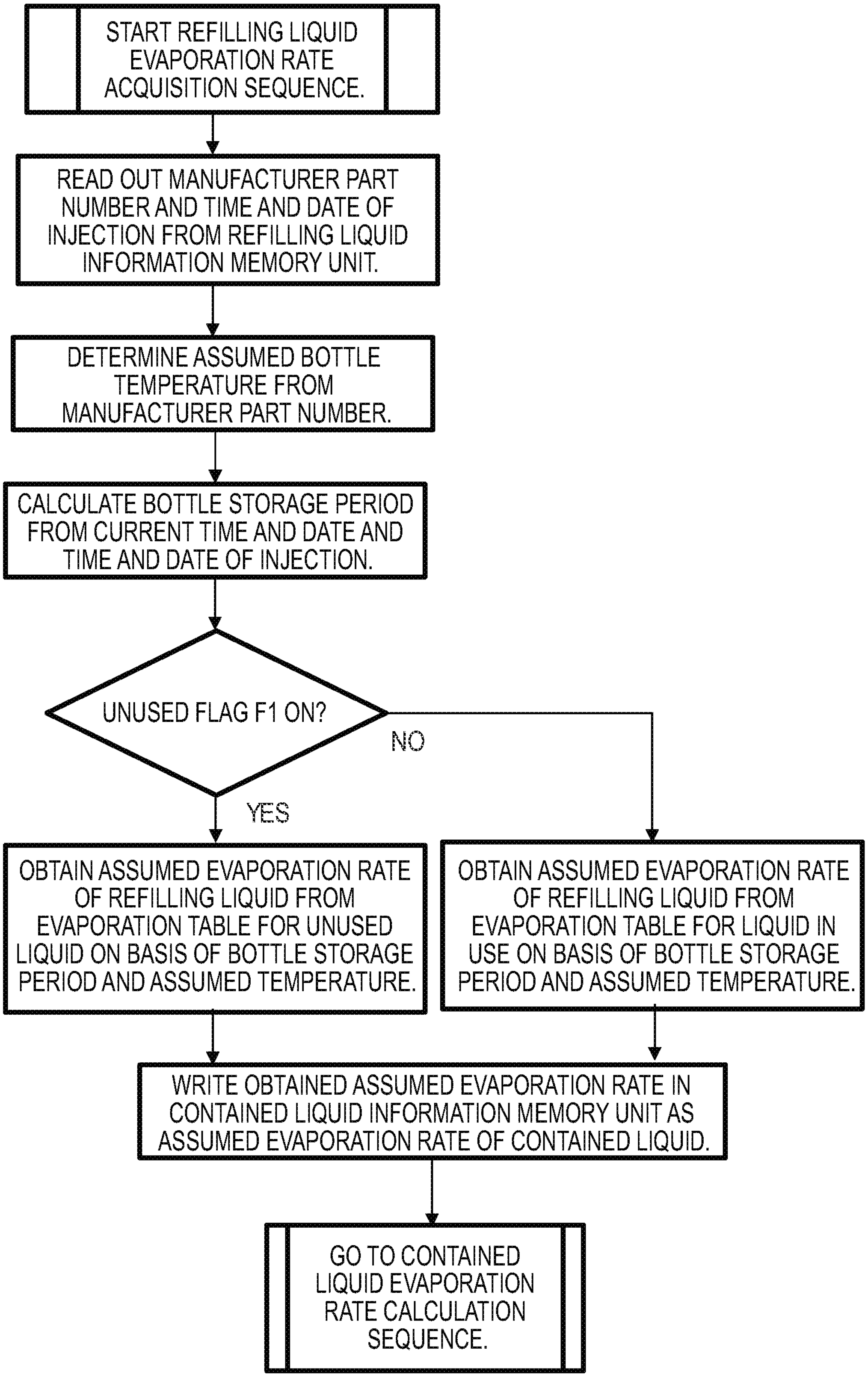
FIG. 7 is a flowchart of the refilling liquid evaporation rate acquisition sequence that follows the sequence of FIG. 6.

Then, the flag verifying sequence as shown in FIG. 6 is started. In the flag verifying sequence, the ASIC 400 acquires the unused flag F1, the in-use flag F2 and the used up flag F3 of the refilling liquid from the refilling liquid information memory unit 200. When the used up flag F3 is on, the ASIC 400 terminates the sequence, keeping the refill liquid flag F9 on. When, on the other hand, both the unused flag F1 and the in-use flag F2 are on, the ASIC 400 displays an error message on the display unit 7 and terminates the sequence, keeping the refill liquid flag F9 on. When either the unused flag F1 or the in-use flag F2 is on, the ASIC 400 moves to the refilling liquid evaporation rate acquisition sequence that is shown in FIG. 7. Although not shown in FIG. 6, the ASIC 400 reads out Standard Expiration Date ED from the refilling liquid information memory unit 200 and compares Time and Date of Standard Expiration Date ED with the current time and date. It may be so arranged that the ASIC 400 issues a warning to the user when Standard Expiration Date ED is over.

Subsequently, the ASIC 400 starts the refilling liquid evaporation rate acquisition sequence as shown in FIG. 7. First, the ASIC 400 reads out Manufacturer Part Number MPN and Time and Date of Injection ID from the refilling liquid information memory unit 200. Additionally, the ASIC 400 reads out the assumed temperature of the bottle 20 that is linked to Manufacturer Part Number MPN. Then, the ASIC 400 determines the time period during which the bottle 20 has been stored from the current time and data and Time and Date of Injection ID. The ASIC 400 also determines the assumed evaporation rate AE of the refilling liquid from the time period during which the bottle has been stored and the assumed temperature of the bottle, referring to the evaporation table stored in the register. At this time, the ASIC 400 refers to the evaporation table for unused refilling liquid when the unused flag F1 is on, whereas it refers to the evaporation table for refilling liquid in use when the in-use flag F2 is on. Then, the ASIC 400 stores the assumed evaporation rate AE of the refilling liquid it has determined in the contained liquid information memory unit 300 as the assumed evaporation rate AE of the contained liquid. Since the refill liquid flag F9 is on at this time, the cap 21 or the cover 8 can be removed and the liquid container 16 can be refilled with liquid.

Figure 8:
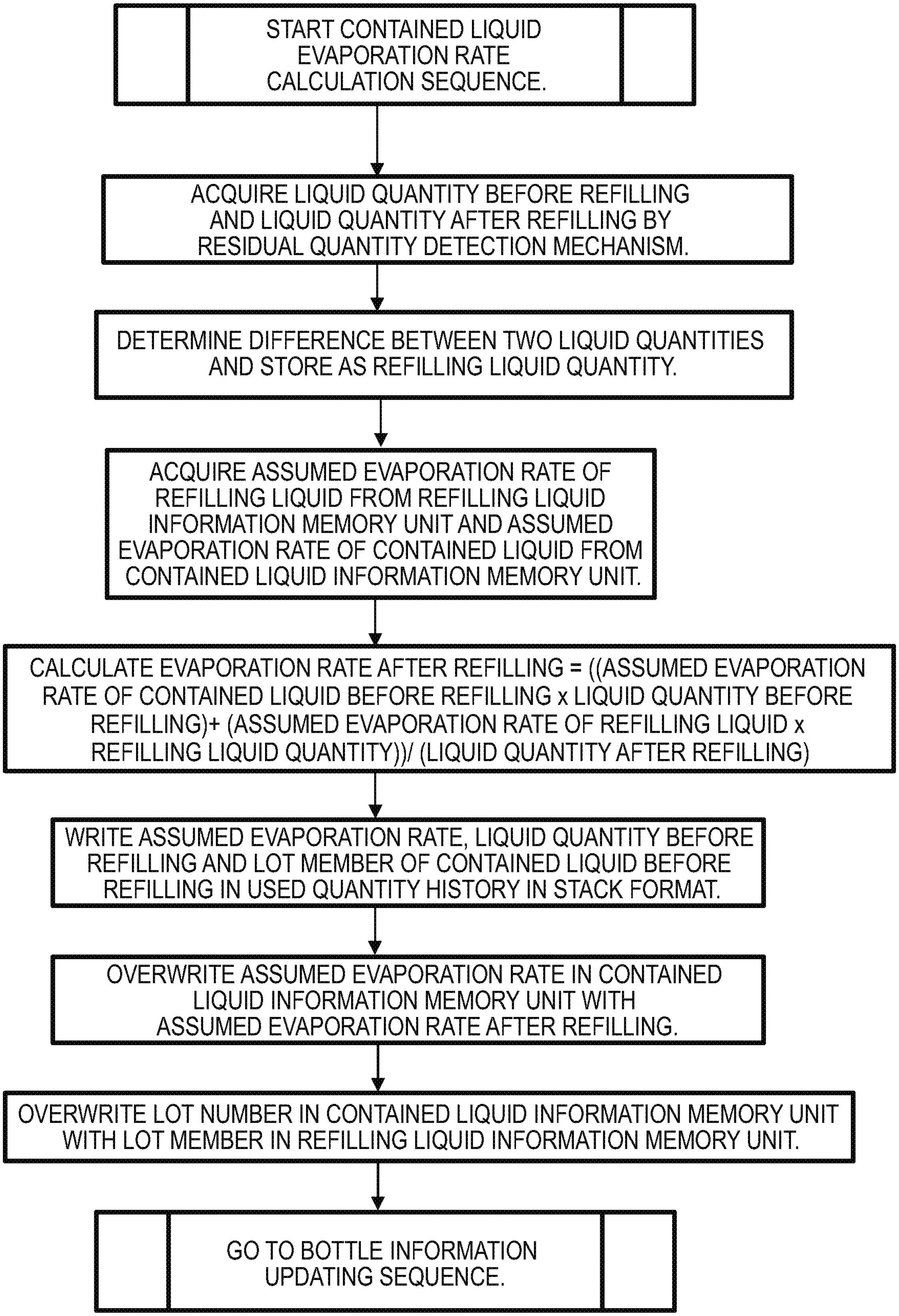
FIG. 8 is a flowchart of the contained liquid evaporation rate calculation sequence that follows the sequence of FIG. 7.

Subsequently, the ASIC 400 starts the evaporation rate calculation sequence of the contained liquid as shown in FIG. 8. Firstly, the ASIC 400 determines the quantity of the liquid (residual amount RA) in the liquid container 16 before the liquid refilling operation and the quantity of the liquid in the liquid container 16 after the actual liquid refilling operation by means of the residual liquid quantity detection mechanism 23 shown in FIG. 2. Then, the ASIC 400 calculates the difference in the amount of liquid in the liquid container 16 between before the liquid refilling operation and after the liquid refilling operation. Thereafter, the ASIC 400 acquires the assumed evaporation rate AE of the refilling liquid from the refilling liquid information memory unit 200 and also acquires the assumed evaporation rate AE of the liquid contained in the liquid container 16 before the liquid refilling operation. Then, the ASIC 400 calculates the assumed evaporation rate AE of the liquid in the liquid container 16 after the liquid refilling operation by means of the arithmetic formula shown below.

(Evaporation rate of contained liquid after refilling)=((Assumed evaporation rate of contained liquid before refilling)×(liquid quantity before refilling)+(assumed evaporation rate of refilling liquid)×(refilling liquid quantity))/(liquid quantity after refilling)

The ASIC 400 writes the liquid quantity before the liquid refilling operation, the assumed evaporation rate AE of the contained liquid before the liquid refiling operation and the lot number LN in Used Quantity History UH of the contained liquid information memory unit 300 in the stack format. Then, the ASIC 400 overwrites (updates) the information relating to the contained liquid that is stored in the contained liquid information memory unit 300 with the information relating to the refilling liquid stored in the refilling liquid information memory unit 200. Namely, the ASIC 400 updates the assumed evaporation rate AE stored in the contained liquid information memory unit 300 with the evaporation rate AE of the contained liquid after the refilling operation as calculated by means of the above-described arithmetic formula. Additionally, the ASIC 400 updates the lot number LN in the refilling liquid information memory unit 200 as the lot number LN in the contained liquid information memory unit 300. When the unused flag F1 is on, the ASIC 400 updates Manufacturer Part Number MPN and Color CL in the refilling liquid information memory unit 200 as Manufacturer Part Number MPN and Color CL in the contained liquid information memory unit 300.

Note that the assumed evaporation rate AE of the contained liquid can appropriately be calculated by means of a method other than the above-described method. For example, when the residual liquid quantity detection mechanism 23 is not provided, the ASIC 400 may use the amount of residual liquid RA it has calculated as the amount of liquid before the liquid refilling operation and also use the difference between Net Quantity NET in the refilling liquid information memory unit 200 and 1st Time Supply Quantity (S1) and 2nd Time Supply Quantity (S2) as the amount of liquid after the liquid refilling operation. Additionally, the maximum value of the amount of liquid that the liquid container 16 can contain may be used as the amount of liquid after the liquid refilling operation.

Figure 9:
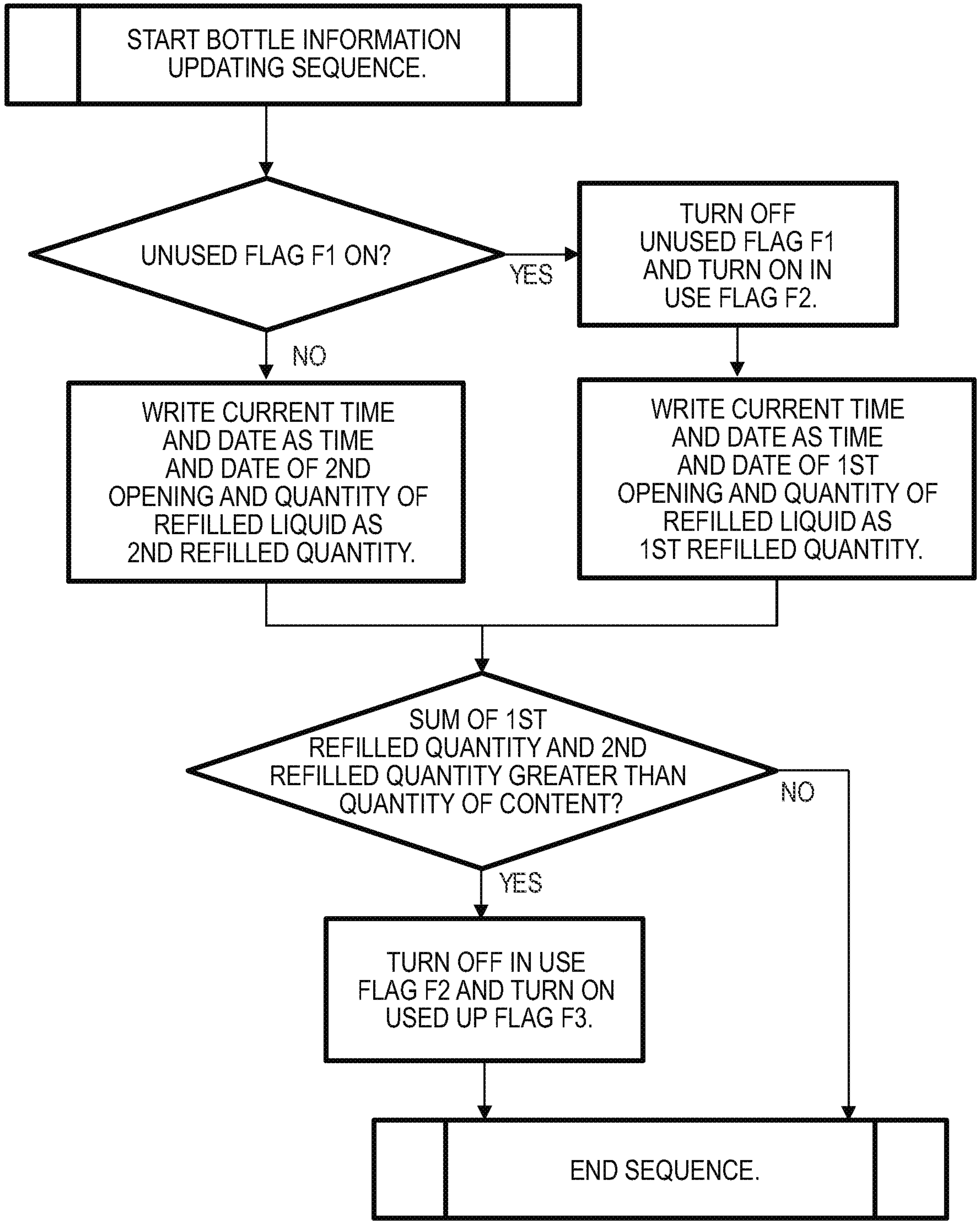
FIG. 9 is a flowchart of the bottle information updating sequence that follows the sequence of FIG. 8.

Thereafter, the ASIC 400 starts the bottle information updating sequence as shown in FIG. 9. First, when the unused flag F1 is on, the ASIC 400 turns off the unused flag F1 of the information medium (e.g., RFID tag) and writes the in-use flag F2 so as to be read as on. Additionally, the ASIC 400 writes the current time and date as Time and Date of 1st Opening OD1 and also writes the amount of the refilled liquid as 1st Time Supply Quantity S1. When, on the other hand, the in-use flag F2 is on, the ASIC 400 writes the current time and date as Time and Date of 2nd Opening OD2 and also writes the amount of the refilled liquid as 2nd Supply Quantity S2. Then, the ASIC 400 compares the sum of 1st Time Supply Quantity 51 and 2nd Time Supply Quantity S2 and Net Quantity NET and, when the sum of 1st Time Supply Quantity 51 and 2nd Time Supply Quantity S2 exceeds Net Quantity NET, it turns off the in-use flag F2 and turns on the used up flag F3. In this embodiment, the number of times of liquid refilling is assumed to be twice. Namely, the assumed number of times of opening the bottle 20 is set to be equal to twice. However, the control performance will be improved when the assumed number of times of opening the bottle 20 is set to be equal to three times or more. The ASIC 400 periodically acquires the reading of the thermistor 24 for the purpose of temperature measurement and updates Temperature History TH of the liquid container in the contained liquid information memory unit 300.

Figure 10:
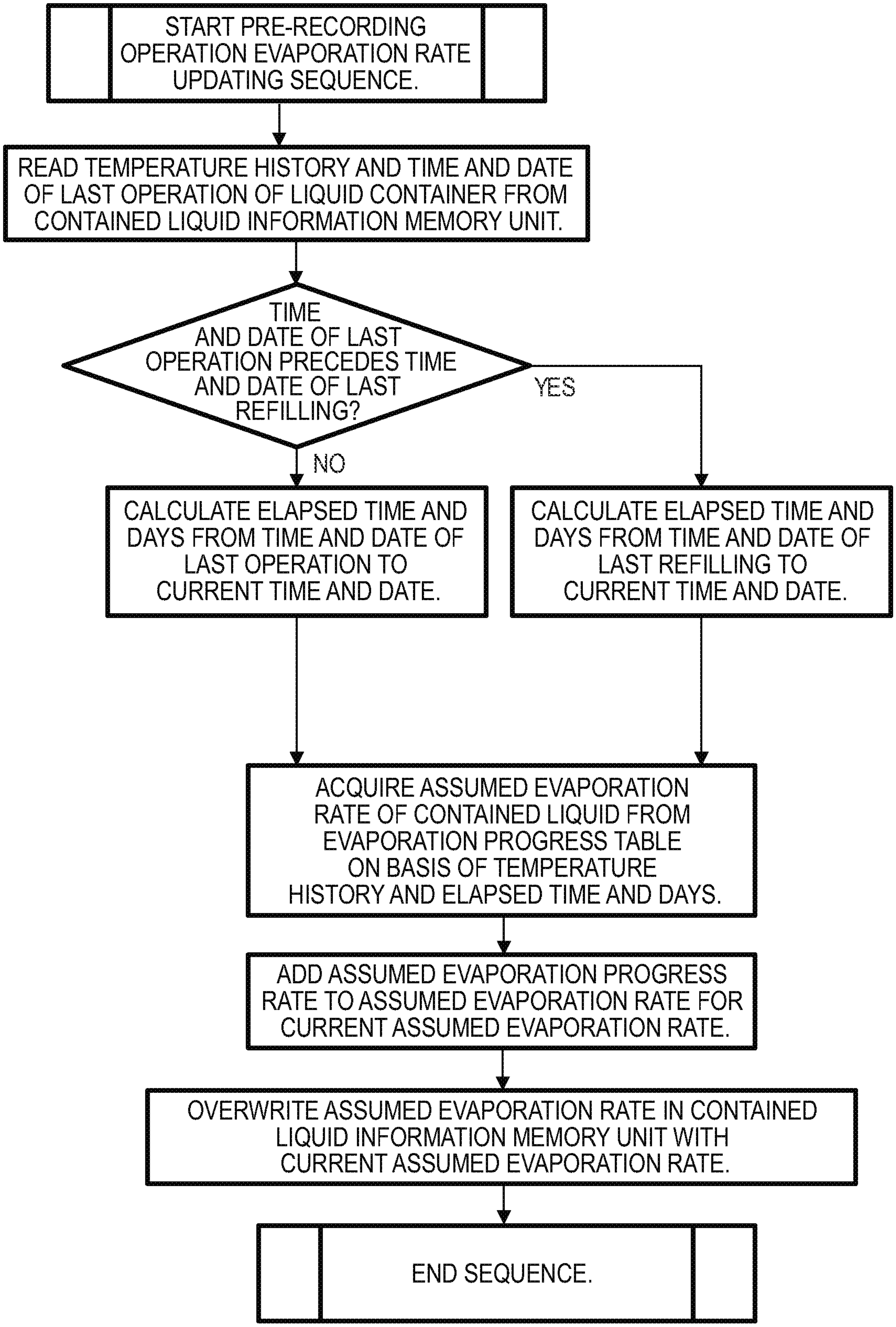
FIG. 10 is a pre-recording operation evaporation rate updating sequence that follows the sequence of FIG. 9.

Prior to the execution of the recording operation, the ASIC 400 updates the assumed evaporation rate AE in the contained liquid information memory unit 300. FIG. 10 shows the evaporation rate updating sequence that will be executed before the recording operation. In this embodiment, the ASIC 400 reads out Temperature History TH of the liquid container and Time and Date of Latest Move LMD from the contained liquid information memory unit 300. When no recording operation is executed since the last liquid refilling operation, the ASIC 400 reads out Time and Date of Last Supply LSD. Then, the ASIC 400 compares the current time and date with Time and Date of Latest Move LMD or Time and Date of Last Supply LSD and calculates the elapsed time and days since the last use. The ASIC 400 refers to the evaporation progress table stored in the register and determines the assumed evaporation progress rate of the contained liquid on the basis of Temperature History TH of the liquid container and the elapsed days since the last use. Thereafter, the ASIC 400 adds the assumed evaporation progress rate to the assumed evaporation rate AE and sets the sum as the current assumed evaporation rate. In this way, the ASIC 400 overwrites the assumed evaporation rate with the newly determined assumed current evaporation rate AE and also Time and Date of Latest Move LMD with the current time and date.

The ASIC 400 turns on one of the normally usable flag F4, the use with caution flag F5, the usage warning flag F6 and the do not use flag F7 according to the assumed evaporation rate AE and turns off all the remaining flags. In this embodiment, the normally usable flag F4 is turned on when the assumed evaporation rate AE is not higher than 10% and the use with caution flag F5 is turned on when the assumed evaporation rate AE is higher than 10% but not higher than 20%, whereas the usage warning flag F6 is turned on when the assumed evaporation rate AE is higher than 20% but not higher than 30% and the do not use flag F7 is turned on when the assumed evaporation rate AE exceeds 30%. Meanwhile, when the current amount of residual liquid RA is not greater than the specified value, the normally usable flag F4, the use with caution flag F5, the usage warning flag F6 and the do not use flag F7 are all turned off and the protect the recording apparatus flag F8 is turned on. Note, however, some other sequence may alternatively be employed to appropriately update the assumed evaporation rate AE of the contained liquid. For instance, when no thermistor 24 is provided, Temperature History TH of the liquid container in the contained liquid information memory unit 300 may be updated by referring to the generally accepted environment temperature of 25° C.

When executing a recording operation, the ASIC 400 refers to the normally usable flag F4, the use with caution flag F5, the usage warning flag F6, the do not use flag F7 and the protect the recording apparatus flag F8. When the do not use flag F7 or the protect the recording apparatus flag F8 is on, the ASIC 400 prohibits any recording operation of the recording apparatus 6. When, on the other hand, the normally usable flag F4 is on, the ASIC 400 allows any normal recording operation of the recording apparatus 6 to be executed.

When the use with caution flag F5 is on, the ASIC 400 controls the operation of the liquid ejection head 15 so as to raise the liquid ejection energy. To do this, for example, the ASIC 400 raises the drive voltage to be applied to the energy generating elements of the liquid ejection head 15 to a level (e.g., 25V) higher than the voltage level (e.g., 24V) for normal recording operations. Alternatively, the ASIC 400 may raise the frequency and the intensity (e.g., to once in every 15 days and for 20 seconds) of the suction recovery operation for discharging the liquid in the ejection orifices prior to a liquid ejection respectively from the normal frequency and the normal intensity (e.g., once in every 25 days and for 10 seconds) or raises the suction pressure (e.g., to 1.1 times) of the suction recovery operation from the normal pressure level. Still alternatively, the ASIC 400 may raise the number of times of preliminary ejections that are executed prior to a normal recording operation (e.g., to 250 times) from the ordinary number of times (e.g., from 100 times) or raise the number of times of preliminary ejections and reduces the time interval of preliminary ejections that are executed during a recording operation (e.g. to seven times in every second) from the normal values (e.g. from five times in every two seconds). The ASIC 400 may raise the intensity of preliminary ejections that are executed during a recording operation from the normal level (e.g., it may raise the level of energy to be used for liquid ejections). In this way, the ASIC 400 brings the current liquid ejecting conditions closer to the normal liquid ejecting conditions.

When the usage warning flag F6 is on, the ASIC 400 raises the width of the drive waveform (drive pulse) (e.g., rectangular waveform) to be applied to the energy generating elements (e.g., to a width of 1.0 μs) from the normal drive waveform (rectangular waveform) (e.g., from a width of 0.8 μs) or alternatively it may reduce the maximum value (threshold value) for the quantity of liquid that is allowed to be ejected in a single scanning operation to 0.8 times of the ordinary value. Additionally, it may reduce the scanning speed of the carriage 14 to a half of the normal scanning speed and reduces the maximum value for the liquid ejection frequency to a half (e.g., to 7.5 kHz) of the normal value (e.g., 15 kHz). In this way, the ASIC 400 brings the current liquid ejecting conditions closer to the normal liquid ejecting conditions.

When the evaporation rate of the liquid is high, the adverse effects of such a high evaporation rate on the recording operation can also appropriately be avoided by some means other than the above-described ones. For example, the conversion table for converting the image recording data into information on the color of each of the liquids that the recording apparatus 6 has may be corrected according to the current evaporation rate of the liquid in the liquid container. Alternatively, the conversion table for converting the image recording data into the liquid ejection rate to be adopted may be corrected according to the current evaporation rate of the liquid contained in the liquid container. Still alternatively, a conversion table for converting the image recording data themselves may be prepared to correct the image recording data according to the current evaporation rate of the liquid in the liquid container by using the conversion table. During the recording operation, the ASIC 400 stores the amount of liquid that is consumed for the recording operation and updates the amount of residual liquid RA after the recording operation. The amount of liquid that is consumed for the recording operation can be calculated from the type of the recovery operation and the number of times of execution of the recovery operation that precedes the recording operation, the number of times of preliminary ejections and the number of times of ejections during the recording operation.

In an experiment, an external container (bottle 20) containing refilling liquid was unsealed once to open the spout. Then, the spout of the bottle 20 was held in a state of mildly sealed by means of a cap and the bottle 20 was left in an environment of a temperature of 25° C. and a relative humidity of 15%. Thereafter, the spout was opened again and the spout of the bottle 20 was put into the refilling port 5 of the liquid container 16 of the liquid ejection apparatus 6. Then, the liquid in the bottle 20 was poured into the liquid container 16. When this experiment was conducted with a known liquid ejection apparatus, the liquid refilling operation was apparently successfully executed without entailing any problem and without requiring any additional special process because the type and the color of the refilling liquid in the bottle 20 were correct ones. However, when a highly dense pattern was formed by ejecting the liquid, a blurred pattern was produced. This was presumably because the spout was once opened and then left in an environment of a temperature of 25° C. and a relative humidity of 15% with the spout of the bottle 20 held in a mildly sealed state to consequently allow the refilling liquid to be degraded. This was probably because the liquid container of the known liquid ejection apparatus was refilled only after checking the type and the color of the refilling liquid and hence the above-identified degradation was overlooked.

On the other hand, the spout of a bottle 20 similar to the above-described one was opened once and then mildly sealed and left in an environment of a temperature of 25° C. and a relative humidity of 15% and the liquid container 16 of the liquid ejection apparatus 6 of this embodiment was refilled with the refilling liquid of the bottle 20. Then, liquid was ejected from the liquid ejection apparatus 6 of this embodiment whose liquid container 16 had been refilled with the refilling liquid of the bottle 20 to form a highly dense pattern but no blurs appeared on the produced pattern. A major reason for this is that, with this embodiment, not only Manufacturer Part Number MPN and Color CL of the refilling liquid but also Net Quantity NET, Time and Date of Injection ID, Standard Expiration Date ED, Time and Date of 1st Opening OD1, 1st Time Supply Quantity S1, Time and Date of 2nd Opening OD2, 2nd Time Supply Quantity S2 and Assumed Evaporation Rate AE were also verified. Particularly when Assumed Evaporation Rate AE is high, the moisture content ratio of the liquid becomes inevitably low and the liquid presumably becomes highly viscous. Then, the liquid ejecting operation of the liquid ejection apparatus 6 is so controlled as to avoid any remarkable fall in the amount of the ejected liquid even its viscosity is relatively high typically by raising the amount of energy to be used for liquid ejection. Then, as a result, this embodiment can realize formation of an excellent image even when the image forming operation is not conducted in optimum conditions. Furthermore, when Assumed Evaporation Rate AE is remarkably high, the recording operation of this embodiment will be suspended to prevent a blurred image from being produced.

Furthermore, this embodiment stores not only information on the refilling liquid in the bottle 20, which is an external container, but also information on the liquid already contained in the liquid container 16. Thus, this embodiment can update at any time Assumed Evaporation Rate AE and other pieces of information on the basis of the information on the refilling liquid and the information on the liquid contained in the liquid container 16. Then, as a result, this embodiment can adapt itself to changes in the characteristics of the liquid attributable to changes in the environment and constantly and satisfactorily keep on executing recording operations typically by appropriately adjusting the conditions for liquid ejection.

Additionally, when the color and the type (Manufacturer Part Number) of the refilling liquid do not agree respectively with the color and the type of the liquid contained in the liquid container, this embodiment immediately turns off the refill liquid flag F9 so as not to prevent the cap 21 or the cover 8 from being removed from the bottle 20. Therefore, when the bottle 20 contains liquid that has evaporated to an excessive extent, this embodiment physically obstructs any liquid refilling attempt. In other words, regardless if the user of the embodiment does not notice the displayed message and/or the issued warning relating to the bottle 20, this embodiment prevents such an inappropriate liquid from being employed for refilling the liquid container.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A liquid ejection apparatus comprising a body, the body comprising:

a liquid container provided inside the body and configured to contain liquid and having a refilling port for refilling the liquid container with liquid;

a contained liquid information memory unit configured to store, as contained liquid information, information on the liquid contained in the liquid container;

a refilling liquid information memory unit configured to store, as refilling liquid information, information on the liquid to be supplied for refilling the liquid container;

a liquid ejection head configured to eject the liquid supplied from the liquid container; and a control unit configured to control an operation of the liquid ejection apparatus according to the contained liquid information stored in the contained liquid information memory unit and the refilling liquid information stored in the refilling liquid information memory unit, wherein the contained liquid information includes information relating to at least a type of the liquid contained in the liquid container and the refilling liquid information includes information relating to at least a type of the liquid to be supplied for refilling the liquid container, and wherein the control unit selectively sets a member covering the refilling port of the liquid container into an openable state or into an unopenable state according to the information stored in the contained liquid information memory unit and the information stored in the refilling information memory unit.

2. The liquid ejection apparatus according to claim 1, wherein the control unit issues a warning to a user of the liquid ejection apparatus when the type of the liquid contained in the liquid container and the type of the liquid to be supplied for refilling the liquid container are not compatible with each other according to the stored contained liquid information and the stored refilling liquid information.

3. The liquid ejection apparatus according to claim 1, wherein the control unit controls the liquid ejection head so as to make the liquid ejection head unable to eject liquid when the type of the liquid contained in the liquid container and the type of the liquid to be supplied for refilling the liquid container are not compatible with each other according to the stored contained liquid information and the stored refilling liquid information.

* * * * *